United States Patent
Kalteis

(10) Patent No.: US 8,351,680 B2
(45) Date of Patent: Jan. 8, 2013

(54) METHOD FOR OPERATING AND/OR MONITORING A FIELD DEVICE, AND CORRESPONDING FIELD DEVICE

(75) Inventor: Helmut Kalteis, Marktoberdorf (DE)

(73) Assignee: Endress + Hauser Wetzer GmbH + Co. KG, Nesselwang (DE)

( * ) Notice: Subject to any disclaimer, the term of this patent is extended or adjusted under 35 U.S.C. 154(b) by 641 days.

(21) Appl. No.: 12/311,998

(22) PCT Filed: Oct. 15, 2007

(86) PCT No.: PCT/EP2007/060962
§ 371 (c)(1), (2), (4) Date: Dec. 22, 2009

(87) PCT Pub. No.: WO2008/049754
PCT Pub. Date: May 2, 2008

(65) Prior Publication Data
US 2010/0150425 A1  Jun. 17, 2010

(30) Foreign Application Priority Data
Oct. 26, 2006 (DE) .......................... 10 2006 051 014

(51) Int. Cl.
*G06K 9/00* (2006.01)

(52) U.S. Cl. ........................................ 382/141

(58) Field of Classification Search .................. 382/141
See application file for complete search history.

(56) References Cited

U.S. PATENT DOCUMENTS

| 5,880,716 A | 3/1999 | Kunugi |
| 6,631,298 B1 | 10/2003 | Pagnano |
| 2002/0165933 A1 | 11/2002 | Yu |
| 2005/0011957 A1* | 1/2005 | Attia et al. ............... 235/462.46 |
| 2007/0007336 A1* | 1/2007 | Kindberg ..................... 235/382 |

FOREIGN PATENT DOCUMENTS

| DE | 102 37 877 | 5/2003 |
| DE | 10 2005 033 001 | 1/2007 |
| WO | WO 2006/016845 | 2/2006 |

\* cited by examiner

*Primary Examiner* — Tarifur Chowdhury
*Assistant Examiner* — Abdullahi Nur
(74) *Attorney, Agent, or Firm* — Bacon & Thomas, PLLC

(57) ABSTRACT

The invention relates to a method for servicing and/or monitoring a field device (1) of process and automation technology. The invention includes that at least one photograph is taken of at least one section (2) of the field device (1), that the photograph is evaluated and/or processed in such a manner, that there results at least one piece of information concerning an access location (11) for field device data related to the field device (1), and/or information for identification of the field device (1), that a request for data is made to the access location (11), and that, in response to the request for data, field device data are supplied. Furthermore, the invention concerns a corresponding field device.

10 Claims, 1 Drawing Sheet

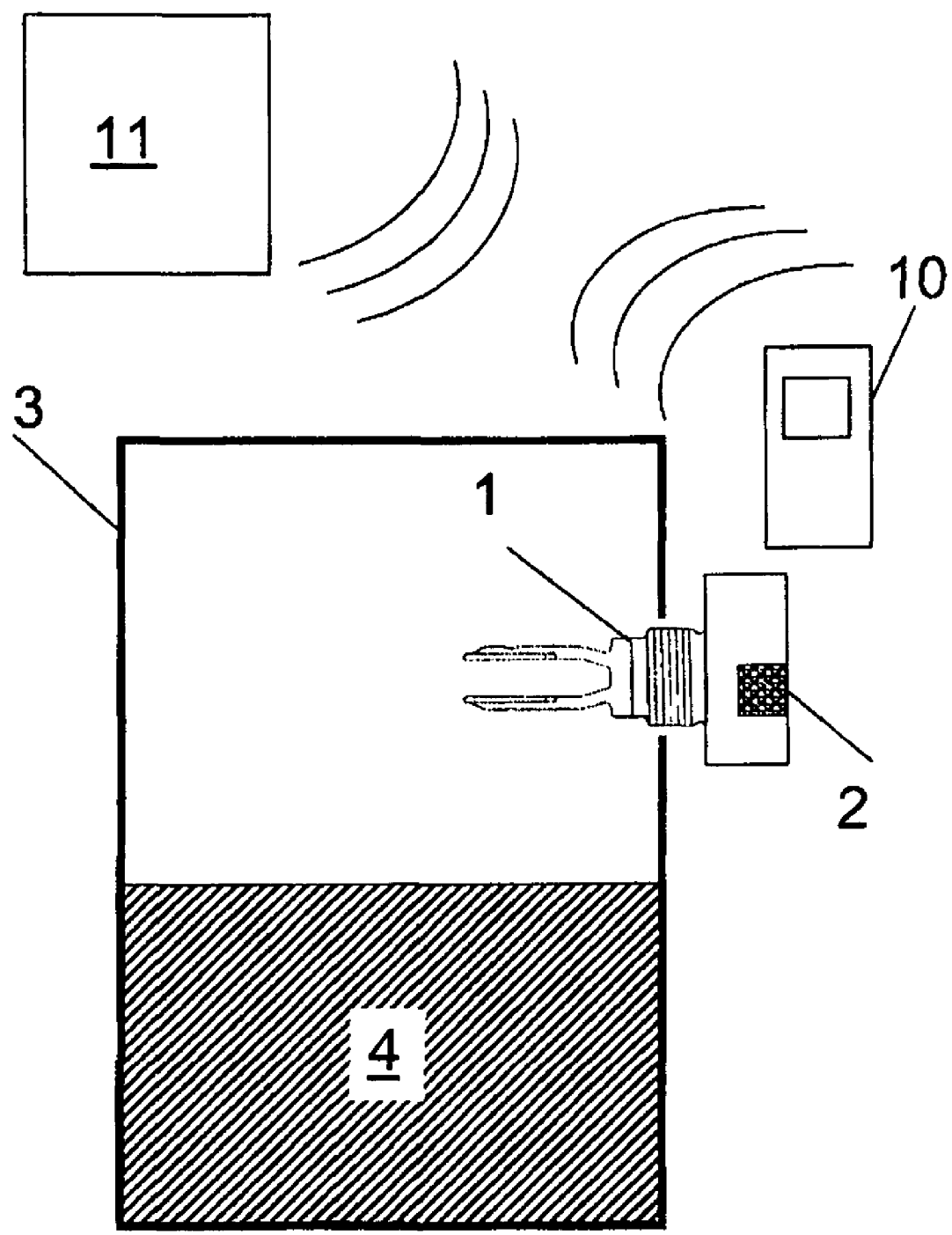

METHOD FOR OPERATING AND/OR MONITORING A FIELD DEVICE, AND CORRESPONDING FIELD DEVICE

TECHNICAL FIELD

The invention relates to a method for servicing and/or monitoring a field device of process and automation technology. Additionally, the invention relates to a corresponding field device of process and automation technology.

BACKGROUND DISCUSSION

In modern process and automation technology, often used in process plants are so-called field devices, which are, for example, measuring devices for measuring process variables, e.g. temperature, fill level, pressure, pH-value or flow. The field devices may also be actuators, e.g. control elements, such as pumps or valves. Such field devices are, most often, provided with a type label or also with a barcode, via which the individual device is identifiable. If, now, a person would like, on-site, to obtain information concerning a particular field device, then such person must e.g. based on the serial number or, on occasion, also in connection with the location of the device, establish contact with a superordinated unit and obtain the information from there.

SUMMARY OF THE INVENTION

An object of the invention is to provide a method for servicing and/or monitoring a field device, in the case of which a service person can simply and, as much as possible, near in time, access data concerning a field device. Another object of the invention is to provide a field device, which permits, as simply and directly as possible, that information is available concerning the field device.

The invention achieves the object by a method for servicing and/or monitoring a field device of process and automation technology, wherein at least one photograph of at least one section of the field device is taken, wherein the photograph is evaluated and/or processed in such a manner, that there results at least one piece of information concerning an access location for field device data related to the field device, and/or information for identification of the field device, wherein a request for data is made to the access location, and wherein, in response to the request for data, the field device data are supplied. The method of the invention includes, thus, that a section of the field device is photographed and that from the resulting photograph an identification of the field device, or an access location, is derived. For this, for example, image recognition is used, or the section is already in such a state, that it permits an easy read-out of the data, e.g. via barcode. Then, a request for data is made at this access location; i.e., for example, a page is requested from a server. In response to the request, data are then supplied, which, preferably, are directly related to the field device. Such can include, for example, a listing of the implemented hardware or software components, information concerning maintenance intervals, calibration data, parameter data or operating instructions, etc. Essential is, thus, that a photograph is the starting point for the request and that obtained from the photograph is the essential information for the request, or for obtaining the field device data associated with the field device.

An embodiment of the method provides, that the photograph is taken by means of a picture taking device, and that the field device data are supplied to the picture taking device. In this embodiment, there is, thus, a supplying of the field device data directly to the picture taking device. Thus, such picture taking device must also be correspondingly so embodied, that it can receive the data and preferably also present such for an observer. In an additional embodiment, however, the picture taking device only receives the data and the presentation on-site occurs on an additional device.

An embodiment of the method includes, that at least the section of the field device is embodied in such a manner, that a photograph of the section contains at least one piece of information concerning the access location and/or information for identification of the field device. The method of the invention finds application both in the case of already existing and, even, installed field devices, and in the case of field devices, which have been embodied specially for the method of the invention. In the latter case, the field device has at least one section, from the photograph of which the needed information can be directly obtained, in that, for example, a URL address is furnished in a graphically evaluatable element.

An embodiment of the method provides, that the access location is at least partially on at least one electronic data server and that the access location is at least partially accessed via an addressing method for networks, especially via a URL address.

An embodiment of the method includes, that the photograph is taken by means of a communication element, especially a photographic mobile phone, as picture taking device. Such a photographic mobile phone serves in an embodiment also to receive the field device data and to present such for the user. In an additional embodiment, the picture taking device is a fixedly installed camera. The latter embodiment is advantageous, for example, in the case of a manufacturing environment. In an additional embodiment, the communication element is a PDA having a photographing function. The picture taking device is thus a communication element, which has to ability to make a photograph. Examples of communication elements are mobile phones and PDAs.

An embodiment of the method provides, that the evaluation and/or further processing of the photograph is performed at least partially by the picture taking device. In this embodiment, thus, the picture taking device is also able, at least partially, to evaluate or to process the photograph. In an additional embodiment, the picture taking device sends the photograph to an evaluation unit.

An embodiment of the method includes, that the evaluation and/or further processing of the photograph is performed, at least partially, by an applet, especially a Java applet, located in the photographic mobile phone. Such an applet can, for example, also be loaded easily into a photographic mobile phone and transforms, thus, a conventional mobile phone into a modified device for the practice of the method of the invention.

An embodiment of the method provides, that to the access location is transmitted at least one code, which provides information concerning which field device data are to be supplied in response to the request for data. In this embodiment, thus, all available field device data are not automatically transmitted, but, instead, according to the code, or, according to the therewith associated access right, selected data are transmitted. In an additional embodiment, this code is input via the start-up of the picture taking device, i.e. based on the code, a request is sent to the access location, which delivers only the appropriate data accessible for the person who input the code. In the case of a mobile phone, this code can thus be, for example, the PIN number, wherein, in such case, the access authorization could be encoded via the telephone number of the mobile phone.

An embodiment of the method includes, that, from the evaluation and/or further processing of the photograph, at least one statement concerning the momentary state and/or concerning expected future behavior of the field device is obtained. If, thus, for example, a part of the field device is photographed, which shows wear or which, for example, comes in contact with a medium, then, by the photograph, also an additional obtaining of information can be produced, in that, for example, on the basis of comparison of photographs stored at the access location, statements can be made concerning the momentary state of the field device or expected future developments.

An embodiment of the method provides that at least one URL address is used for the request for data.

The invention solves the object furthermore by a field device of process and automation technology, wherein at least one section of the field device is embodied in such a manner, that a photograph of the section provides at least one piece of information concerning an access location for field device data related to the field device, and/or information for identification of the field device.

BRIEF DESCRIPTION OF THE DRAWING

The invention will now be explained in greater detail on the basis of the appended drawing, the sole FIGURE of which shows as follows:

FIG. 1 is a schematic drawing of practice of the method of the invention with a field device of the invention.

DETAILED DISCUSSION IN CONJUNCTION WITH THE DRAWING

A measuring device or field device 1 of FIG. 1 is, for example, a mechanical, oscillatory fork for monitoring fill level of a medium 4 in a container 3. The housing of the measuring device 1 is here embodied in such a manner, that, in the section 2, information concerning an Internet address is encoded, from which data concerning the measuring device 1 can be obtained. In this embodiment, thus, section 2 is embodied, for example, by applying a corresponding element in such a manner that, directly from the photograph, the necessary information is present, in order to request the field device data from the access location 11, wherein the access location 11 in an additional embodiment is composed of a plurality of data servers, so that the data request and the supply of the data is performed from different subunits. In an additional embodiment, the field device 1 is an already existing field device 1, which only has a company label and/or a barcode. A photograph of such a field device 1 results, thus, first only in an identification of the field device 1. The picture taking device 10 contacts then, for example, an access location 11 and transmits, based on the photograph and, on occasion, also based on available GPS data, the identification of the device, in order to receive corresponding field device data. I.e. in this second variant (not shown), the picture serves for identification of the field device 1 and the access location is contacted with a request for information concerning this particular field device 1.

Used as picture taking device 10 here is a photographic, mobile phone, in which also a Java applet is stored, which reconstructs the Internet address from the photograph of the section 2. In an additional embodiment, the photograph is transmitted to an additional, evaluation unit, which evaluates the picture, and which, on occasion, also has access to data concerning the field device. To be distinguished is, however, whether the evaluation of the photograph takes place within the picture taking device 10 or at least partially outside the picture taking device 10. In the here illustrated example, the picture taking device 10, via the, for example, extracted URL, contacts a data server as access location 11 and receives from this, data supplied concerning the field device 1.

In an additional embodiment, the service person sends to the access location 11 a code, via which the scope of the data, which is allowed to be supplied to the service person, which, thus, is permitted to be sent from the access location 11, is established. Thus, the code is a type of enabling code. In an additional embodiment, also that region of the field device 1 is photographed, which comes in contact with the medium 4 and which is subject to a certain wear. This picture is then used together with data from the access location 11, in order to obtain statements concerning the state of the field device at that time (e.g. concerning the question of whether a reliable measuring is still possible) or concerning future behavior—on occasion, also as regards predictive maintenance or the planning of service work.

The invention claimed is:

1. A method for servicing and/or monitoring a field device of process and automation technology, comprising the steps of:
    taking at least one photograph of at least one section of the field device, wherein the field device possesses a housing, which housing is embodied in such a manner that information concerning an Internet address is encoded in the section from which Internet address data concerning the field device can be obtained; and
    evaluating and/or processing the photograph in such a manner, that there results at least one piece of information concerning an access location for field device data related to the field device, such that a request for data is made to the access location, wherein:
    the at least one piece of information about the access location is the Internet address,
    the photograph is the starting point for the request and that the essential information for the request is obtained from the photograph; and that,
    in response to the request for data, field device data are supplied from the access location.

2. The method as claimed in claim 1, wherein:
    the photograph is taken by means of a picture taking device; and
    the field device data are transmitted to the picture taking device.

3. The method as claimed in claim 1, wherein:
    at least the one section of the field device is embodied in such a manner, that a photograph of the at least the one section contains at least one piece of information concerning the access location and/or information for identification of the field device.

4. The method as claimed in claim 1, wherein:
    the access location is at least partially in at least one electronic data server; and
    the access location is accessed at least partially via an addressing method for networks, especially via a URL address.

5. The method as claimed in claim 1, wherein:
    the photograph is taken by means of a communication element, especially a photographic mobile phone, as picture taking device.

6. The method as claimed in claim 1, wherein:
    evaluation and/or further processing of the photograph is performed at least partially by the picture taking device.

7. The method as claimed in claim 5, wherein:

evaluation and/or further processing of the photograph is performed at least partially by an applet, especially a Java applet, in the photographic mobile phone.

8. The method as claimed in claim 1, wherein:

transmitted to the access location is at least one code, which provides information concerning which field device data are to be supplied in response to said request for data.

9. The method as claimed in claim 1, wherein:

from the evaluation and/or further processing of the photograph, there is obtained at least one statement concerning the momentary state, and/or concerning expected future behavior, of the field device.

10. The method as claimed in claim 1, wherein:

for said request for data, at least one URL address is applied.

* * * * *